(12) United States Patent
Seki

(10) Patent No.: US 6,827,361 B2
(45) Date of Patent: Dec. 7, 2004

(54) REAR WHEEL SUSPENSION DEVICE FOR SADDLE RIDE VEHICLE

(75) Inventor: Bunzo Seki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 65 days.

(21) Appl. No.: 10/273,144

(22) Filed: Oct. 18, 2002

(65) Prior Publication Data
US 2003/0146593 A1 Aug. 7, 2003

(30) Foreign Application Priority Data
Oct. 23, 2001 (JP) ........................................ 2001-325559

(51) Int. Cl.[7] .............................................. B60G 3/04
(52) U.S. Cl. .............................. 280/124.134; 180/210; 180/215; 280/124.135; 280/124.136
(58) Field of Search ................... 280/124.134, 124.135, 280/124.136, 124.138, 124.139, 124.143, 781, 787; 180/311, 210, 211, 212, 215

(56) References Cited

U.S. PATENT DOCUMENTS

| | | | | |
|---|---|---|---|---|
| 4,650,210 A | * | 3/1987 | Hirose et al. | 280/798 |
| 4,786,075 A | * | 11/1988 | Takahashi | 180/254 |
| 6,533,060 B1 | * | 3/2003 | Seto | 180/337 |
| 6,695,329 B2 | * | 2/2004 | Handa | 280/124.135 |

FOREIGN PATENT DOCUMENTS

JP  07-090818  4/1995

* cited by examiner

Primary Examiner—Eric Culbreth
(74) Attorney, Agent, or Firm—Birch, Stewart, Kolasch & Birch, LLP

(57) ABSTRACT

A rear wheel suspension device for saddle ride vehicle which does not influence the riding space for the rider even where the stroke of rear wheels is enlarged. A suspension arm includes an oscillation center and an oscillation end portion. The oscillation center is vertically oscillatably fitted to a vehicle body frame, and the oscillation end portion is fitted with the axle of a rear wheel. The oscillation axis of the suspension arm is inclined so as to be higher on the front side than on the rear side of the saddle ride vehicle. As a result, the moving direction of the rear wheels is rearwards and upwards. With this configuration, the vertical stoke of the rear wheels can be enlarged, without having the rear wheels interfere with the rear fenders.

14 Claims, 6 Drawing Sheets

REAR WHEEL SUSPENSION DEVICE FOR SADDLE RIDE VEHICLE

CROSS-REFERENCE TO RELATED APPLICATION

The present application claims priority under 35 U.S.C. §119 to Japanese Patent Application No. 2001-325559, filed on Oct. 23, 2001, the entire contents of which are hereby incorporated by reference.

BACKGROUND OF THE INVENTION

1. Field of the Invention

The present invention relates to a rear wheel suspension device for a saddle ride vehicle, for example, a vehicle for running on rough terrain.

2. Description of Background Art

Heretofore, a saddle ride vehicle such as the structure shown in FIG. 6 has been known.

The saddle ride vehicle denoted by numeral 1 in the figure comprises a vehicle body frame 2, front wheels 3 fitted on both sides of a front lower portion of the vehicle body frame 2, and rear wheels 4 fitted on both sides of a rear lower portion of the vehicle body frame 2. The rear wheels 4 are each vertically movably supported by a rear wheel suspension device which comprises a swing arm 5 vertically oscillatably fitted to a rear lower portion of the vehicle body frame 2, and a shock absorber 6 intermediately provided between an oscillation end portion of the swing arm 5 and the vehicle body frame 2 located on the upper side of the oscillation end portion.

In addition, a fender 7 is provided covering the upper side of the vehicle body frame 2, the front wheels 3, and the rear wheels 4, and a seat 8 for the rider W is provided at a roughly central portion of the vehicle body frame 2.

In addition, Japanese Patent Publication No. Hei 7-90818 shows an example of a support structure for the rear wheels 4, in which the suspension device is a so-called diagonal suspension.

In the saddle ride vehicle 1 comprising such swing arms 5 according to the related art, there is still the following problem left to be improved. Namely, when the rear wheel 4 is moved vertically, the rear wheel 4 is moved along an arc-shaped movement locus around the oscillation center of the swing arm 5, so that the rear wheel 4 is moved skewly forwards.

Where the stroke of the vertical movement of the rear wheel 4 must be enlarged, it is necessary to shift the fender 7 forwards for securing a space for movement of the rear wheel 4. With the fender 7 thus shifted forwards, however, it becomes necessary to shift also a rear end portion of the seat 8 forwards. As a result, there is the problem that a riding space for the rider W is narrowed.

Besides, in the rear wheel suspension device using the above-mentioned diagonal suspension, the movement locus of the rear wheel is roughly linear, and the forward movement of the vehicle is reduced. However, depending on the stroke amount of the rear wheels, the above-mentioned problem is again generated.

SUMMARY AND OBJECTS OF THE INVENTION

The present invention has been made in consideration of the above problem in the related art. Accordingly, it is an object of the present invention to provide a rear wheel suspension device for saddle ride vehicle which does not influence the riding space for the rider even where the stroke of rear wheels is enlarged.

In order to attain the above object, according to a first aspect of the present invention, a rear wheel suspension device for saddle ride vehicle fits a pair of left and right rear wheels to a vehicle body frame, and includes a suspension arm which is vertically oscillatably fitted to the vehicle body frame and is fitted with an axle of the rear wheel at an oscillation end portion thereof. In this configuration, the oscillation axis of the suspension arm is inclined so as to be higher on the front side than on the rear side of the saddle ride vehicle.

According to a second aspect of the present invention, first and second suspension arms are provided at vertically spaced two positions, and the oscillation axes of the suspension arms are set substantially parallel to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
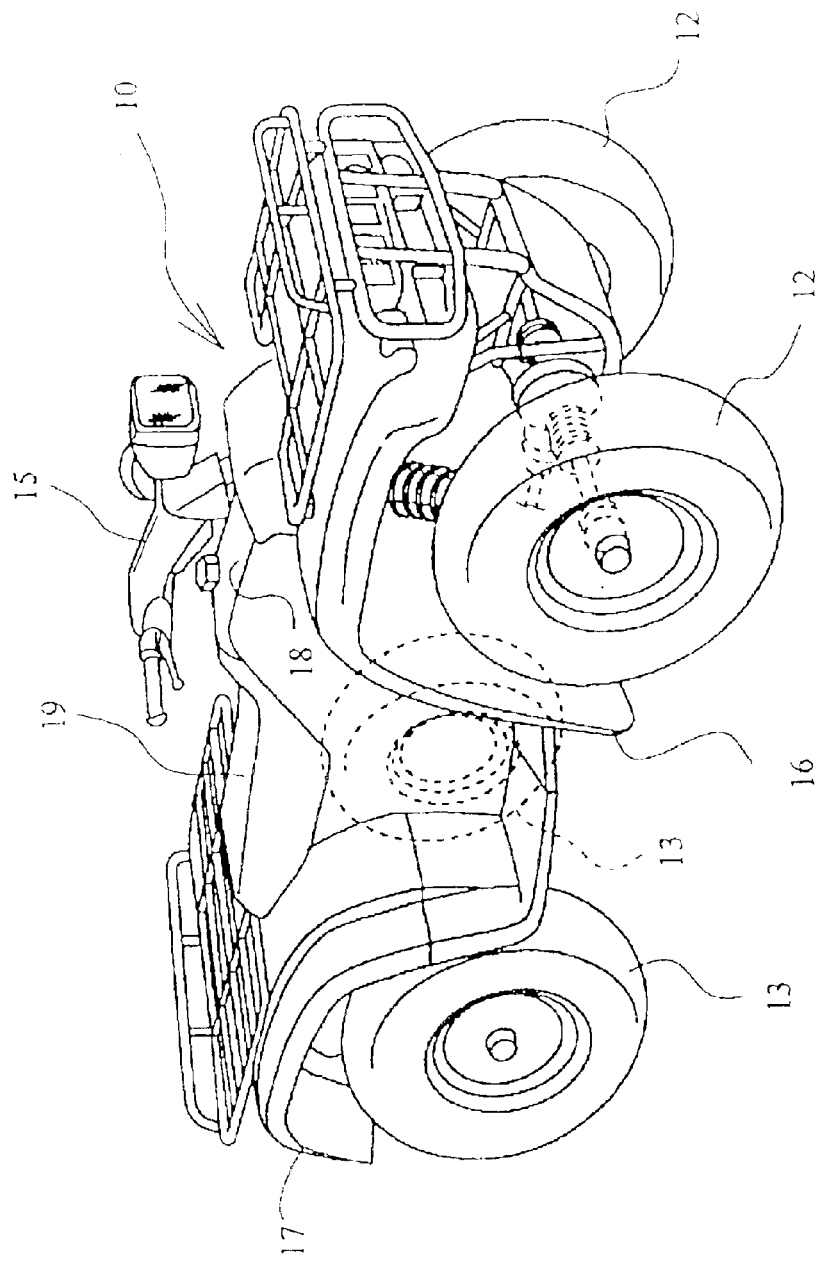
FIG. 1 is an outlook perspective view showing one embodiment of the present invention.
Figure 2:
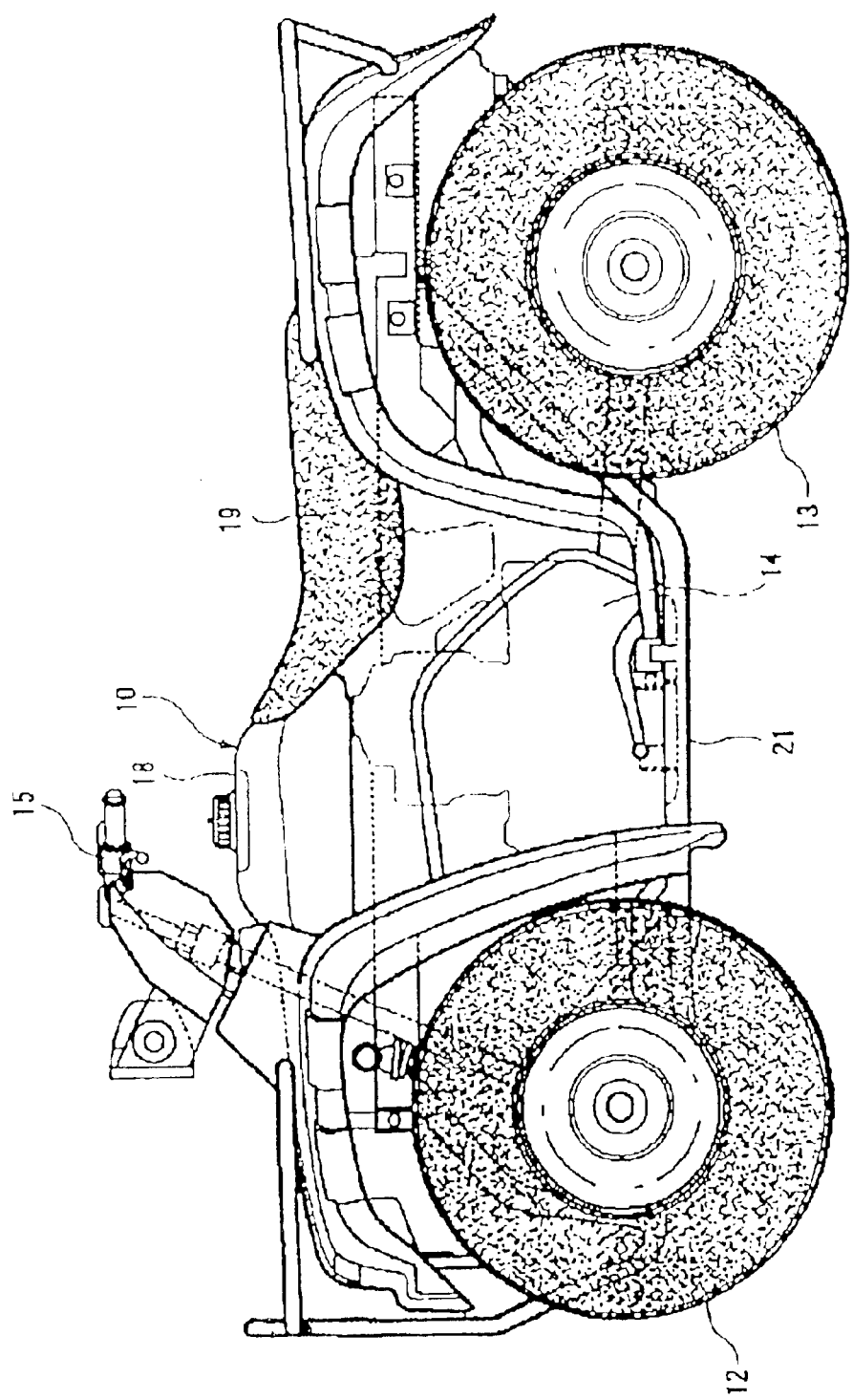
FIG. 2 is a side view showing one embodiment of the present invention.
Figure 3:
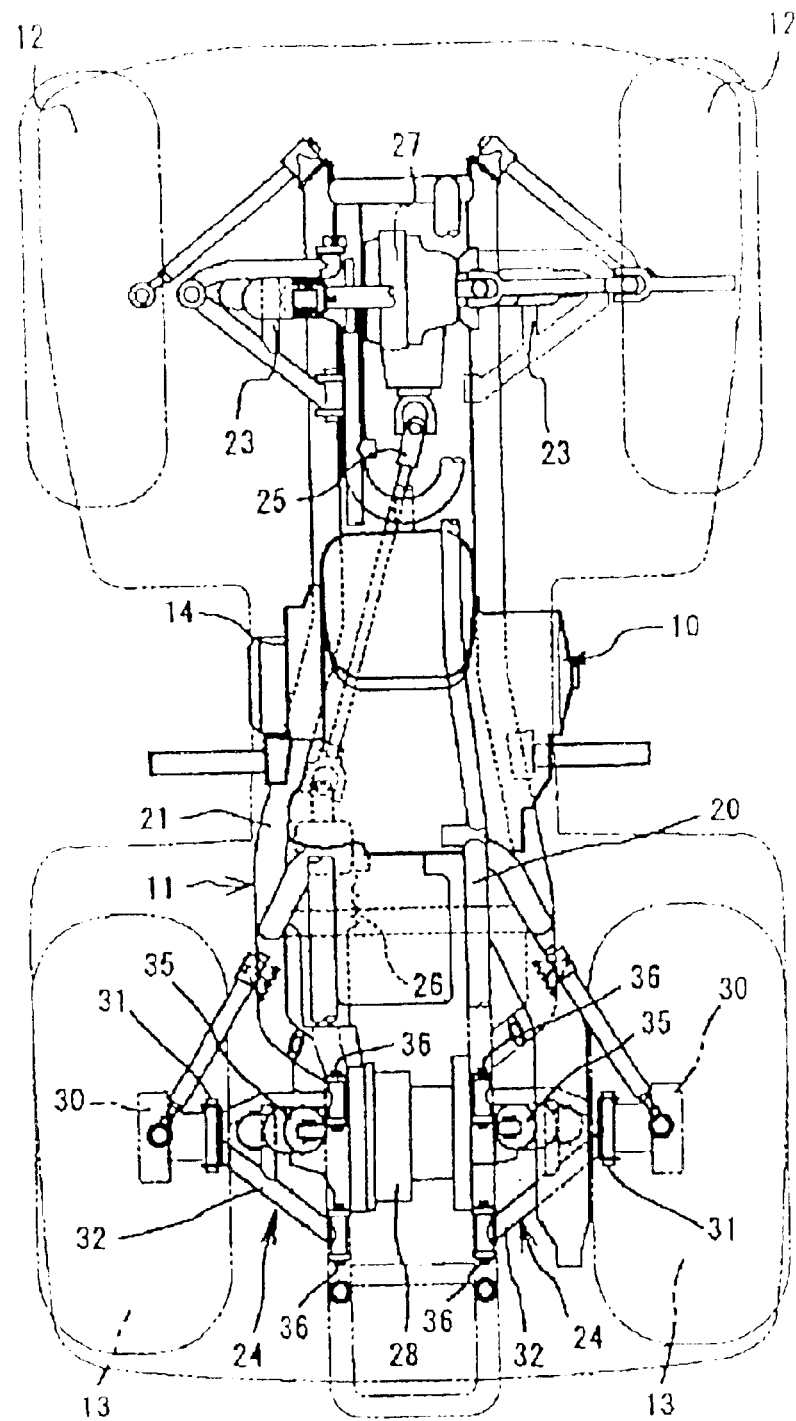
FIG. 3 is a general plan view showing the frame constitution of one embodiment of the present invention.

Now, one embodiment of the present invention will be described below referring to FIGS. 1 to 5.

In FIGS. 1 to 4, saddle ride vehicle 10 pertains to the present embodiment.

The saddle ride vehicle 10 comprises a vehicle body frame 11, front wheels 12 provided on both sides of a front lower portion of the vehicle body frame 11, rear wheels 13 provided on both sides of a rear lower portion of the vehicle body frame 11, an engine 14 mounted at a central portion of the vehicle body frame 11, and a steering device 15 provided at a front portion of the vehicle body frame 11 for steering the front wheels 12.

In addition, a front fender 16 is provided covering the upper side of a front portion of the vehicle body frame 11, and a rear fender 17 is provided covering the upper side of a rear portion of the vehicle body frame 11. The front fender 16 is so formed as to cover the upper and rear sides of the front wheels 12, and the rear fender 17 is so formed as to cover the front and upper sides of the rear wheels 13.

Further, a fuel tank 18 is provided on the rear side of the front fender 16 and on the upper side of the engine 14, and a seat 19 for the rider W is provided on the rear side of the fuel tank 18.

Figure 4:
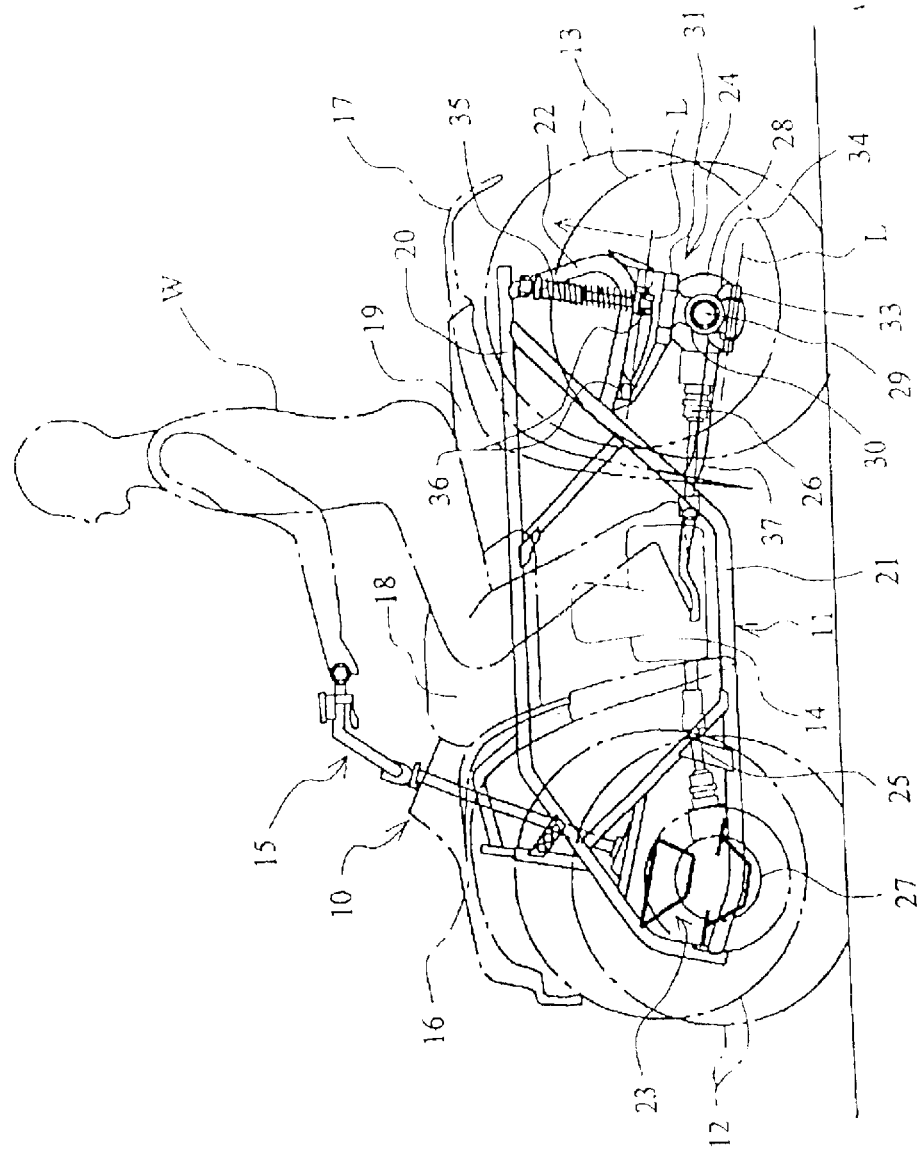
FIG. 4 is a side view showing one embodiment of the present invention.

As will be detailed referring to FIG. 4, the vehicle body frame 11 comprises an upper frame 20 to which the front fender 16, the rear fender 17, the fuel tank 18, the seat 19 and the like are fitted, and an under frame 21 provided on the lower side of and in connection with the upper frame 20 and forming a mounting space portion for the engine 14. A rear portion of the under frame 21 is bent rearwards and upwards, and is connected to a rear end portion of the upper frame 20. A rear frame 22 extending rearwards is provided between the bent portion and the rear end portion of the upper frame 20.

Front wheel suspension devices 23 for supporting the front wheels 12 are provided at front portions of the upper frame 20 and the under frame 21, and rear wheel suspension devices 24 for supporting the rear wheels 13 are provided on the rear frame 22.

The engine 14 is provided with a front propeller shaft 25 extending forwards, and a rear propeller shaft 26 extending rearwards. A front final gear 27 for transmitting the rotation of the front propeller shaft 25 to both the front wheels 12 is provided at a tip end portion of the front propeller shaft 25, and a rear final gear 28 for transmitting the rotation of the rear propeller shaft 26 to both the rear wheels 13 is provided at a tip end portion of the rear propeller shaft 26.

In this embodiment, the rear wheel suspension device 24 is comprised of a first suspension arm 32 which is vertically oscillatably fitted at one end to the vehicle body frame 11. The other end of the first suspension arm 32, namely the oscillation end portion, is rotatably connected through a pivot shaft 31 to an upper portion of an axle casing 30 rotatably fitted with an axle 29 of the rear wheel 13. The rear wheel suspension device 24 also includes a second suspension arm 34 which is also vertically oscillatably fitted at one end to the vehicle body frame 11. The other end of the second suspension arm 34, namely the oscillation end portion, is rotatably connected through a pivot shaft 33 to a lower portion of the axle casing 30. A shock absorber 35 is rotatably connected to the vehicle body frame 11 and the first suspension arm 32.

In addition, the oscillation center of the first suspension arm 32 is bifurcated, and each of the end portions is rotatably connected to the rear frame 22 through a pivot shaft 36. Further, the oscillation center of the second suspension arm 34 is rotatably connected through a pivot shaft 38 to an under pipe 37 extended rearwards from the under frame 21, on the lower side of the rear frame 22.

The axes of the pivot shafts 31, 33, 36, 38 are substantially parallel to each other, and, as indicated by symbol L in FIG. 4, these axes, namely, the oscillation axes of the first suspension arm 32 and the second suspension arm 34 are inclined so as to be higher on the front side than on the rear side of the saddle ride vehicle 10.

Figure 5:
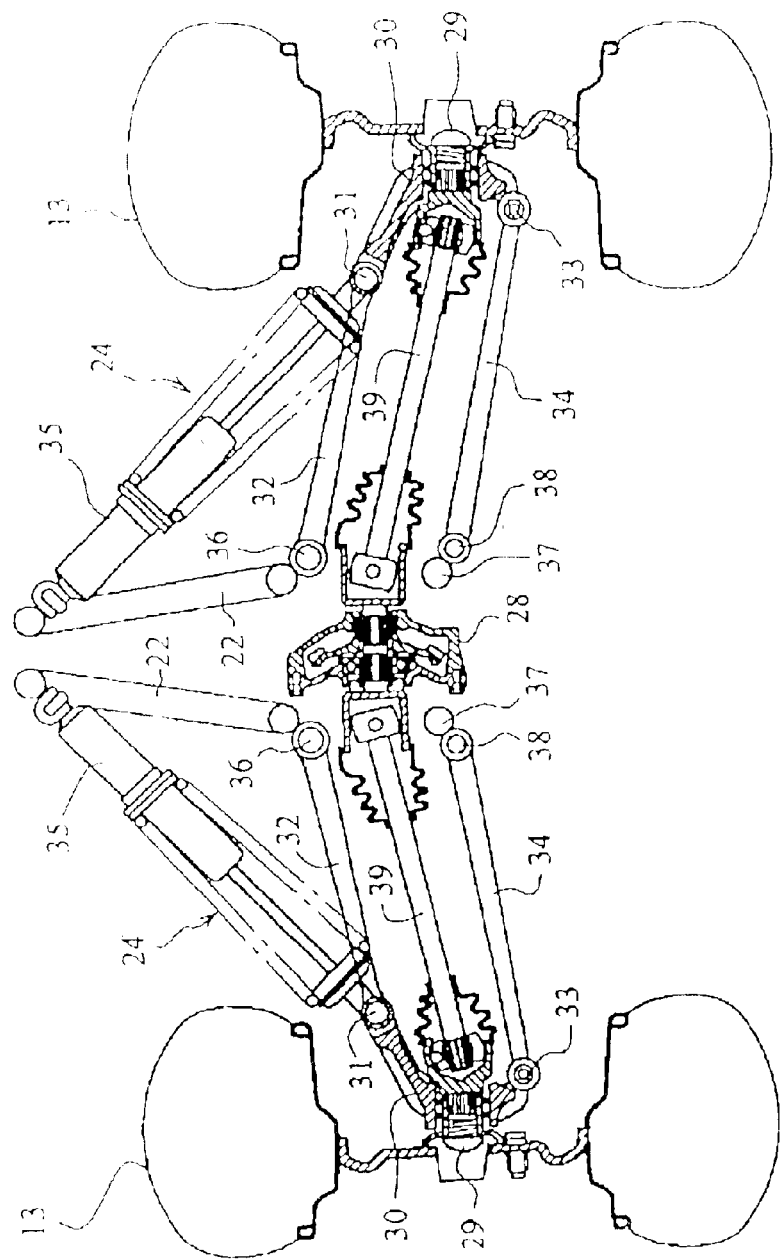
FIG. 5 is an enlarged view of a major part showing one embodiment of the present invention.
Figure 6:
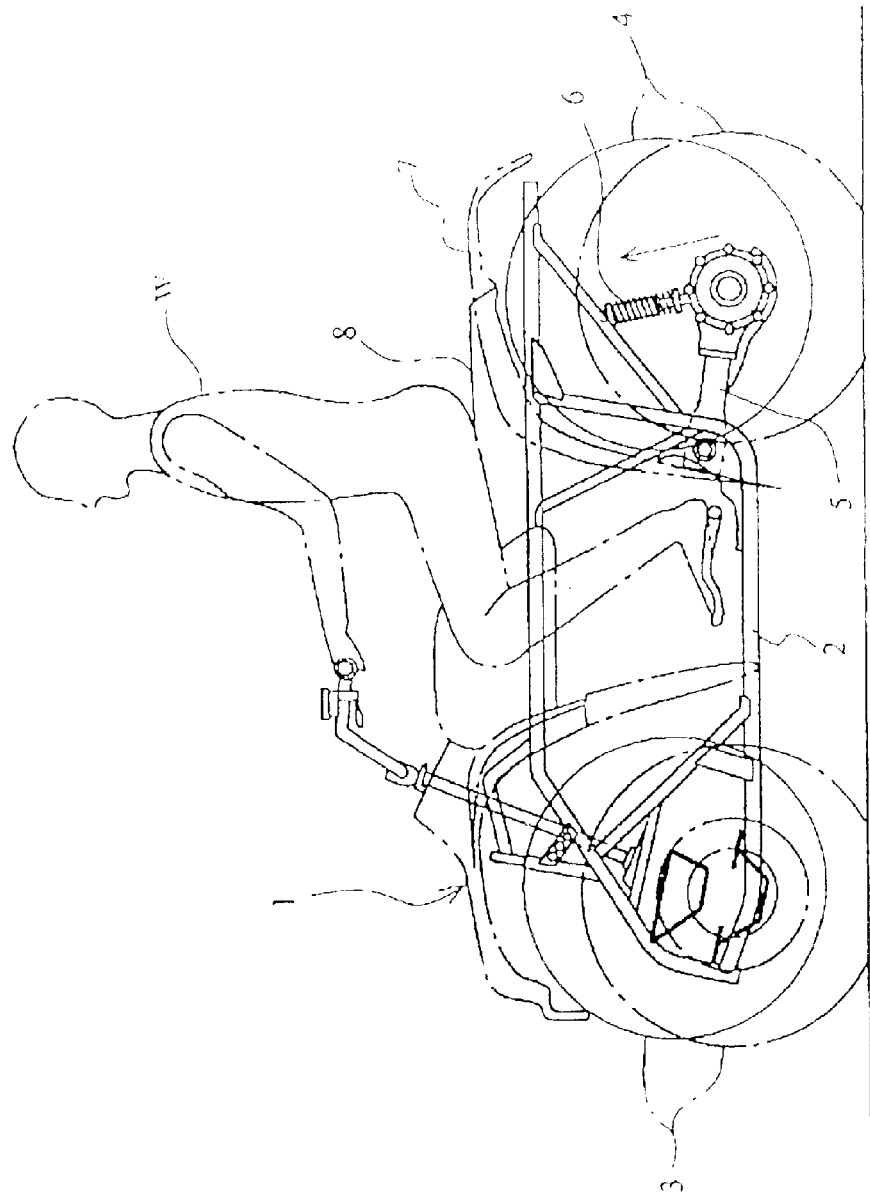
FIG. 6 is a side view showing one example of the related art.

FIG. 5 shows a drive shaft 39 for transmitting the rotation from the rear final gear 28 to each of the rear wheels 13.

In the present embodiment constituted as above, when the rear wheels 13 are moved upwards relative to the vehicle body frame 11, the first and second suspension arms 32 and 34 oscillate upwards.

Since the oscillation axes L of the first and second suspension arms 32 and 34 are so set as to be lower on the rear side than on the front side, the moving direction of the rear wheels 13 is rearwards and upwards as indicated by arrow in FIG. 4.

Therefore, when the rear wheels 13 are moved as mentioned above, the rear wheels 13 are not moved toward the rear fender 17 provided covering the front side of the rear wheels 13. Thus, even when the vertical stroke of the rear wheels 13 is enlarged, the rear wheels 13 and the rear fender 17 do not interfere with each other. Accordingly, it is unnecessary to shift the fitting position of the rear fender 17 toward the front side. As a result, the riding space for the rider W is not narrowed.

The shapes, sizes and the like of component members shown in the above embodiment are mere examples, and various modifications are possible based on design requirements or the like. For example, while an example in which two suspension arms are provided at upper and lower positions has been shown in the above embodiment, either one of the upper and lower suspension arms can be omitted.

As has been described above, according to the rear wheel suspension device for saddle ride vehicle of the present invention, the oscillation axes of the suspension arms are inclined so as to be higher on the front side than on the rear side of the saddle ride vehicle, whereby the moving direction of the rear wheels can be set to be skewed rearwards and upwards. Thus, when the rear wheels are moved upwards, the rear wheels can be prevented from moving toward the fender provided covering the front side of the rear wheels.

Therefore, even where the vertical stroke of the rear wheels is enlarged, the rear wheels and the fender are prevented from interfering with each other, so that it is unnecessary to shift the fitting position of the fender toward the front side. As a result, the riding space for the rider can be prevented from being narrowed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel suspension device for saddle ride vehicle, for fitting a pair of rear wheels to a vehicle body frame of said saddle ride vehicle, comprising:

at least one suspension arm having an oscillation center and an oscillation end portion, wherein said oscillation center of said at least one suspension arm is vertically oscillatably fitted to said vehicle body frame and said oscillation end portion of said at least one suspension arm is fitted with a rear axle casing, and wherein an oscillation axis of said at least one suspension arm is inclined so as to be higher on the front side than on the rear side of said saddle ride vehicle.

2. The rear wheel suspension device for saddle ride vehicle as set forth in claim 1, wherein said at least one suspension arm includes a first suspension arm and a second suspension arm provided at two vertically spaced positions, and oscillation axes of said first suspension arm and said second suspension arm are set substantially parallel to each other.

3. The rear wheel suspension device for saddle ride vehicle as set forth in claim 2, wherein an oscillation end portion of the first suspension arm is rotatably connected through a pivot shaft to an upper portion of said rear axle casing, said axle casing rotatably fitted with said rear axle.

4. The rear wheel suspension device for saddle ride vehicle as set forth in claim 2, wherein an oscillation center side of the first suspension arm includes bifurcated end portions, and said bifurcated end portions are rotatably connected to a rear frame through a pivot shaft.

5. The rear wheel suspension device for saddle ride vehicle as set forth in claim 2, wherein an oscillation end portion of the second suspension arm is rotatably connected through a pivot shaft to a lower portion of said axle casing.

6. The rear wheel suspension device for saddle ride vehicle as set forth in claim 2, wherein an oscillation center of the second suspension arm is rotatably connected through a pivot shaft to an under pipe extending rearwardly from an under frame, on a lower side of a rear frame.

7. The rear wheel suspension device for saddle ride vehicle as set forth in claim 2, further comprising a shock absorber rotatably connected to the vehicle body frame and the first suspension arm.

8. A rear wheel suspension device for saddle ride vehicle, for fitting a pair of rear wheels to a vehicle body frame of said saddle ride vehicle, comprising:

at least one suspension arm having an oscillation center and an oscillation end portion, wherein said oscillation center of said at least one suspension arm is vertically oscillatably fitted to said vehicle body frame and said oscillation end portion of said at least one suspension arm is fitted with a rear axle casing, wherein an oscillation axis of said at least one suspension arm is inclined so as to be higher on the front side than on the rear side of said saddle ride vehicle, and wherein a moving direction of the rear wheels is set to be skewed rearwards and upwards.

9. The rear wheel suspension device for saddle ride vehicle as set forth in claim 8, wherein said at least one suspension arm includes a first suspension arm and a second suspension arm provided at two vertically spaced positions, and oscillation axes of said first suspension arm and said second suspension arm are set substantially parallel to each other.

10. The rear wheel suspension device for saddle ride vehicle as set forth in claim 9, wherein an oscillation end portion of the first suspension arm is rotatably connected through a pivot shaft to an upper portion of said rear axle casing, said axle casing rotatably fitted with a rear axle.

11. The rear wheel suspension device for saddle ride vehicle as set forth in claim 9, wherein an oscillation center side of the first suspension arm includes bifurcated end portions, and said bifurcated end portions are rotatably connected to a rear frame through a pivot shaft.

12. The rear wheel suspension device for saddle ride vehicle as set forth in claim 9, wherein an oscillation end portion of the second suspension arm is rotatably connected through a pivot shaft to a lower portion of said axle casing.

13. The rear wheel suspension device for saddle ride vehicle as set forth in claim 9, wherein an oscillation center of the second suspension arm is rotatably connected through a pivot shaft to an under pipe extending rearwardly from an under frame, on a lower side of a rear frame.

14. The rear wheel suspension device for saddle ride vehicle as set forth in claim 9, further comprising a shock absorber rotatably connected to the vehicle body frame and the first suspension arm.

* * * * *